Jan. 17, 1967   W. H. ECHOLS   3,298,615
APPARATUS FOR BREAKING UP A FOAM
Filed Sept. 25, 1964
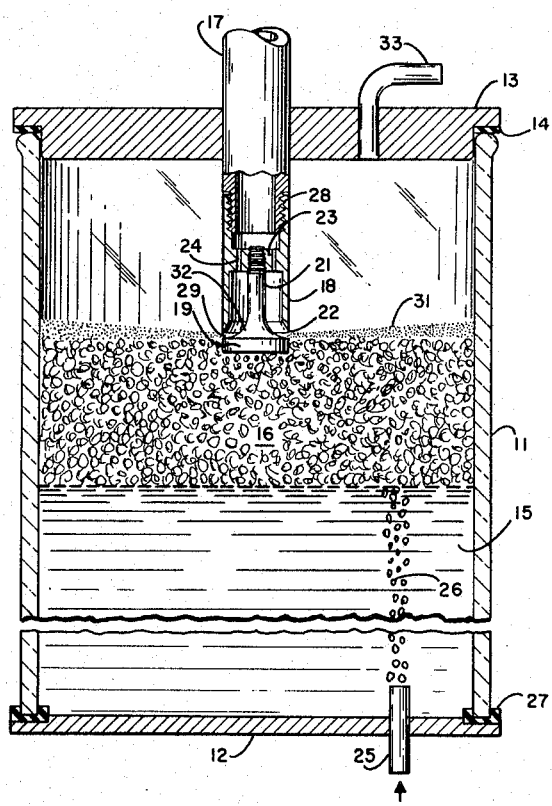
INVENTOR
WILLIAM H. ECHOLS
BY George J. Crasanakis
AGENT
ATTORNEY

United States Patent Office 3,298,615
Patented Jan. 17, 1967

3,298,615
APPARATUS FOR BREAKING UP A FOAM
William H. Echols, Fort Foote Village, Md., assignor to the United States of America as represented by the Secretary of the Navy
Filed Sept. 25, 1964, Ser. No. 399,417
4 Claims. (Cl. 239—514)

The invention described herein may be manufactured and used by or for the Government of the United States of America for governmental purposes without the payment of any royalties thereon or therefor.

This invention relates to a foam-breaking apparatus.

In many instances foam formation has been a very serious and annoying problem, often complicated by foams of widely differing compositions and properties. The foam may be so stiff that considerable difficulty will be encountered in conveying it through apertures or feed conduit. The foam may be due to substances that impart such low surface tension that any mechanical contrivance used to break foam bubbles will only succeed in re-creating smaller ones. The foam may also be characterized by corrosive action, a condition that becomes ruinous to mechanical parts.

A main obstacle encountered in aerobic fermentation and other organic processes is the presence of rather large amounts of foam as a result of air bubbled through an organic medium. Aerobic bacteria require effusive aeration if high yield cultures is to be obtained. Even in moderate aeration, many microbiological media will foam profusely forming a relatively stable foam, the rate of foam formation being substantially greater than the rate of foam dissipation.

A number of mechanical foam breakers exist for controlling foam. The prior art prescribes various agitators and beaters in which moving parts crush bubble surfaces and set the entrained gas free. Rotating equipment have been employed which impart a centrifugal force by which the liquid component of the foam is made sufficiently heavy to crush the foam bubbles. Spraying equipment which force foam through a nozzle have also been employed for breaking the foam. In all such devices, power-operated equipment have been required along with conduits and separate treating chambers for conveying the foam. Mechanical foambreakers have been relatively expensive and difficult to maintain at equilibrium conditions.

Chemical foam inhibitors are very effective in controlling a given foam, but they cannot be used for some cultures, even in slight amounts, for they are readily adsorbed on bacterial surfaces and interfere with the growth processes.

An object of the present invention is to provide a novel device for breaking down foam in a simple and more efficient manner than with prior art devices.

Another object of the invention is to provide a foam-breaking apparatus which does not depend on any moving parts for its operation.

A further object of the invention is to provide a novel apparatus which can be adapted to produce a given mass of aerosol of constant average size and dispersity.

A still further object of the invention is to provide an improved device for defoaming a bacterial culture without cycling the culture media through defoaming devices nor affecting the growth process of the bacteria.

Further objects will appear hereinafter in the detailed description that follows taken in conjunction with the accompanying drawing.

In the drawing is a sectional elevation of a glass cylinder in which a bacterial culture is maintained aerobically resulting in the formation of a large amount of foam and showing a foam reducer embodying the present invention.

2

According to the present invention the foam is broken down by subjecting it to a thin blanket of air ejected at high velocity. The thin blanket of air is maintained within a cylindrical column or tube at any suitable level above the liquid phase. As the foam rises to the level of the air, it is siphoned into the air stream where air velocity and pressure effects completely destroy the foam.

Referring now more particularly to the drawing, there is shown a glass cylinder or column 11 having a bottom closure 12, fitted with a water-tight seal 27, and a cover plate 13 resting on a rubber ring 14. The cylinder contains therein a liquid medium 15, which is readily susceptible to foaming, that contains viable microorganisms, for example, a culture of Bacillus megaterium. A foam layer 16 forms readily in the column as a result of aeration through gas dispersion tube 25, the dispersion of air bubbles 26 through the liquid generating a non-breaking foam on top of the liquid.

The air blanket is provided by an air nozzle comprising a pipe 17, threaded at its lower end at 28 to engage the threaded portion of tubular member 18. A cylindrical end plate 19 attached to stem 21 is fitted closely to the tubular member to form a peripheral slit 29. The interior lip 22 at the lower end of said tubular member is beveled 45 degrees to provide a knife edge. Air passage through slit 29 is aerodynamically efficient due to the absence of any surface near the slit that could create back pressure during air flow.

The stem 21 is threadably mounted to an inner plate 23 supported within the tubular member, the threaded connection providing means for adjusting the opening at the slit. A plurality of axially aligned openings 24 through said inner plate permit passage of air to the slit region of the nozzle. An arcuate surface 32 in the stem attachment to said end plate, allows a smooth radial transition to air passing downward to minimize turbulence and eddy formation near the slit. A sheet-like stream of air will thus be provided uniformly from a 360 degree slit.

With this construction it will be seen that an air air blanket 31 is directed horizontally across the entire tube and surrounding the air nozzle. The slit opening is preferably in the range of about 1–3 mils although larger slit openings can also be used if sufficiently high air pressures are available. Smaller slit openings of 1–3 mils can provide suitable air streams at pressures of about 5–20 p.s.i.g. and even more.

It may be noted that a mass culture apparatus such as the glass tube shown in the drawing is sealed to prevent the escape of aerosols which carry bacterial organisms into the air. Vigorous aeration of the culture medium in the tube through dispersion tubes, such as the one shown at 25 provides a positive pressure within the tube. The sheet of air emerging from the nozzle provides a further increase in pressure within the tube. It is desirable therefore to obtain a relatively thin jet for the practice of the invention, in order for the pressure within the tube to be maintained at a minimum.

The present invention may be used with foams of diverse composition and properties. Thus a very tenacious and corrosive froth may be suppressed with air stream with considerable ease. It is preferred to use a container of a radially symmetrical form since this arrangement is advantageous for the radial air discharge to fan out over the entire area with equal force. In this form of apparatus, a tube of about 4–8 inches in diameter is readily blanketed with an air jet emerging from a nozzle ⅝ inch in diameter with a one mil peripheral slit.

When the foam surface in the tube reaches the thin sheet of air, the foam is siphoned into the low pressure region near the slit. Foam is hurled away from the nozzle forming aerosol particles, liquid droplets and some coarse foam aggregates. Two related actions may be inferred for the breakup of foam in accordance with the invention: (1) Foam bubbles siphoned into the low pressure region of the jet are swiftly expanded and they burst. (2) Bubble films are sheared by the action of the air stream. Ultimately, foam breakage leads to aerosol, liquid and water vapor. The aerosol formation is polydisperse.

Liquid recovery from aerosol formation may be achieved by placing an impactor (not shown) in the effluent duct 33. The impactor consists of a small opening through which air emerges. A plate located a few opening diameters from said opening will receive or impact thereon aerosol particles of a given size, weight, density or momentum impact. Due to inertial effects, only aerosol particles of a certain minimum dimension and over can be impacted in this manner. Smaller aerosol particles remaining in the effluent air are then directed to a blast burner in which any bacteria transported by aerosol particles are incinerated.

The present device for controlling foam is more advantageous over previous devices because the liquid and foam phases are not transferred out of the tube for processing and thus a constant level of liquid and foam are retained in the tube during continuous operation. Liquid losses are more effectively minimized since there is a minimum of fluid transport out of the tube. Equilibrium conditions are more easily obtained with a constant liquid and foam phase during the entire operation.

While the invention has been described herein with particular reference to its use in bacterial culture, its field of usefulness is not so limited. Therefore, it is not intended that the description shall be considered in a limited sense, or that the use of particular language or phraseology pertaining to the application mentioned shall in any way restrict the scope or limit the uses for which the invention may be employed.

Having now described my invention and in what manner the same shall be used, what I claim as new and desire to protect by Letters Patent is:

1. A nozzle through which air is forced for breaking up foam in a container containing a liquid from which foam is formed, which comprises:
    a tubular member of uniform inside and outside dimensions,
    said tubular member including an inlet and an outlet end,
    said outlet having a beveled end with the slope of said beveled end sloping downwardly toward the outer circumference of said tubular member,
    an inner plate supported in said tubular member between said inlet and said outlet normal to the axis of said tubular member,
    said inner plate including a central axially aligned threaded aperture therethrough and a plurality of axially aligned air passages through said inner plate surrounding said central axially aligned aperture,
    a cylindrical end plate,
    a stem extending from said cylindrical end plate,
    said stem including a threaded end and an arcuate end surface,
    said arcuate end surface being connected with said end plate with the arc extending in the axial direction of said stem,
    said threaded stem end screw-threaded into the central axially aligned aperture of said inner plate to provide an adjustable radial slit between said cylindrical end plate and said beveled end of said tubular member,
    and means for connecting said inlet end of said nozzle to an air supply means.

2. A nozzle as claimed in claim 1, wherein:
the beveled outlet end of said tubular member is at a 45° angle.

3. A nozzle as claimed in claim 2, wherein:
said nozzle is screw-threaded onto said air supply means.

4. A nozzle as claimed in claim 3, wherein:
the spacing between said cylindrical plate and said outlet end of said tubular member is from about 1 mil to about 3 mils.

References Cited by the Examiner

UNITED STATES PATENTS

| | | | |
|---|---|---|---|
| 1,223,081 | 4/1917 | Lissauer | 239—514 |
| 3,056,749 | 10/1962 | Griffith | 55—178 |
| 3,101,176 | 8/1963 | Goss | 239—524 |
| 3,256,677 | 6/1966 | Boucher et al. | 55—178 |

OTHER REFERENCES

Boucher et al., "Studies on Control of Foam by Acoustic and Aerodynamic Means," Final Report, N.Y.U. College of Engineering, February 1962, pp. 13–15 and Figure 8.

REUBEN FRIEDMAN, *Primary Examiner.*

C. N. HART, *Assistant Examiner.*